United States Patent
Elberbaum (10) Patent No.: US 7,945,032 B2
(45) Date of Patent: May 17, 2011

(54) METHOD AND APPARATUS FOR CONNECTING AND OPERATING LOCKERS FOR HOME DELIVERIES VIA VIDEO INTERPHONES AND REMOTELY VIA A VIRTUAL DOORMAN

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 832 days.

(21) Appl. No.: 11/949,853

(22) Filed: Dec. 4, 2007

(65) Prior Publication Data
US 2009/0141117 A1  Jun. 4, 2009

(51) Int. Cl.
*H04M 11/00* (2006.01)
(52) U.S. Cl. ............................ 379/102.06; 348/14.04
(58) Field of Classification Search ............... 348/14.04; 379/102.06, 102.01
See application file for complete search history.

(56) References Cited

U.S. PATENT DOCUMENTS

| | | | | |
|---|---|---|---|---|
| 5,923,363 A | * | 7/1999 | Elberbaum | 348/156 |
| 6,999,825 B2 | | 2/2006 | Inomata | |
| 2004/0053641 A1 | * | 3/2004 | Leung et al. | 455/558 |
| 2004/0243426 A1 | | 12/2004 | Hashimoto | |
| 2007/0266081 A1 | * | 11/2007 | Murchison et al. | 709/203 |

FOREIGN PATENT DOCUMENTS

| | | | |
|---|---|---|---|
| JP | 03102497 A | * | 4/1991 |
| JP | 2004236797 A | * | 8/2004 |
| KR | 2003-0019038 | | 3/2003 |
| KR | 2003-0083290 | | 10/2003 |
| KR | 10-2005-0030784 | | 3/2005 |

OTHER PUBLICATIONS

International Search Report dated Jun. 29, 2009, from corresponding International Application No. PCT/US2008/083346.
International Preliminary Report on Patentability and Written Opinion of the International Searching Authority dated Jun. 8, 2010, from corresponding International Application No. PCT/US2008/083346.

* cited by examiner

*Primary Examiner* — Stella L Woo
(74) *Attorney, Agent, or Firm* — Katten Muchin Rosenman LLP (57) ABSTRACT

A method and apparatus for connecting and operating plurality of lockers in a multi apartment or multi office building connected via an interface to a video interphone system and via a local guardman or a virtual guardman over a network, for providing access to the building and opening a locker for a deliveryman to deliver packages, parcels and ordered goods. The tenants receiving a message through their video interphone monitor can retrieve the deliveries by opening the specific locker from their video interphone monitor, through the entry panel and through associated accessories.

20 Claims, 5 Drawing Sheets

METHOD AND APPARATUS FOR CONNECTING AND OPERATING LOCKERS FOR HOME DELIVERIES VIA VIDEO INTERPHONES AND REMOTELY VIA A VIRTUAL DOORMAN

BACKGROUND OF THE INVENTION

1. Field of the Invention

This invention is related to lockers and rooms for storing packages delivered to residents that is controlled via a video interphone system, by a local concierge or guardman and remotely operated over a network or the Internet via an e-services of a virtual doorman.

2. Description of the Prior Art

Room and lockers for storing delivered packages and parcels by couriers, or food and laundry delivery from a nearby or far shops, exist in condominiums, offices and rental apartments buildings for accommodating such deliveries when a tenant is absent or cannot see the deliveryman in person. Such storage rooms may be divided into different rooms, or facilities within one room, including refrigerated storage facilities for groceries and food for example, or hangers for laundry returned items and/or shelves for other packages and parcels. The main doors for such facilities are locked via a mechanical or an electric keys that are operated by the local guardman or the concierge for enabling the delivery person to complete the delivery into the storage room when the tenant is unavailable to receive the package by himself. To retrieve the deliveries each of the tenants has a key, or is provided with a code for opening the mechanical or the electrical lock of the room or rooms at a time of his convenience.

The access by the deliveryman to the storage rooms is only possible when the local guardman or concierge is on site, more over it is the guardman or the concierge who can sign the delivery papers, mostly with the notation that the delivery was stored in the locked room at a given time and date. The problems with such storage rooms is therefore, that it is only possible for the deliveryman to complete the delivery when a guardman or a concierge is on site. Round the clock or 24 hr guardman on site is too costly and cost reductions are being attempted by builders and tenants by the employing the services of a virtual doorman over the Internet.

A virtual doorman can communicate and view the image of the deliveryman, observed by a CCTV camera and propagated over the Internet along with the two way voice communication and only after a verification process, communicated between the operator of the virtual doorman monitoring room and the deliveryman, the operator will open the main door (to the building) and the door to the storage rooms, enabling the deliveryman to enter the building and the storage room without local supervision. This represents serious problems, because the virtual doorman is unable to verify the delivery on one hand, nor to insure the security and the integrity of the delivered packages inside the storage room on the other.

Moreover, the tenants having the key or the codes to enter the storage room, requiring no clearance by the virtual doorman to enter, may themselves tamper with the delivered parcel without any records. Even though the entry can be monitored by an automated system including the recording onto a Digital video recorder, using close circuit television monitoring system, or be identified during the entry to the storage room via other access control means, it is not possible to prevent tampering with the door lock and the door, so that they can exit the room with the doors remain unlocked. This leaves the delivered packages, parcels, food and other items unattended, behind tempered lock or non closed doors, thereby becoming an easy target for thieves, including tenants or outside persons, such as a masqueraded deliveryman.

Other known systems for managing secured lockers for delivery and retrievals of parcels and packages require to preregister and/or the purchase of a coded card or keys for each individual tenant and for each deliveryman and/or the processing of a preordered goods and/or preprogram an accesses to a given locker and/or preprogram a reserved locker, resulting in lengthy verification processes at the time of ordering of goods and for both, the delivery and/or the retrieval. Such systems have proven to be non practical and too complex to handle in day today life, causing failed deliveries, and difficulties in retrievals, increase costs and frustrations.

SUMMARY OF THE INVENTION

It is an object of the present invention to provide a method and apparatus for management and facilities for locked rooms and lockers and other storage facilities that are operated by the tenants, local guardman or concierge, and via a virtual doorman's e-services through the Internet or other networks in combination with a video interphone system or shopping terminals installed in the building. Similar method and apparatus for integrating remote control keys with video interphone system is disclosed in a U.S. Pat. No. 7,290,702. "Shopping terminals" are disclosed in the U.S. application Ser. No. 10/864,311 dated Jun. 8, 2004 and PCT international application PCT/US05/19564 dated Jun. 3, 2005 for a method and apparatus for simplified e-commerce shopping via home shopping terminals. Video interphones systems are disclosed in U.S. Pat. Nos. 5,923,363, 6,603,842 and 6,940,957.

The apparatus for the lockers include multiple lockers made of strong steel or other robust structure, each with an individual locked door with its interiors clearly visible from the outside of the cage. The electrical lock of each such door is remotely operated and can be opened by an "open" command when the cage is empty, generated from the local guardman or concierge control panel, or by a tenant from his video interphone monitor or shopping terminal and by a virtual doorman through the Internet from his command center via the Internet or other network.

Once an empty locker is addressed and opened for a fresh delivery and is relocked, the locker can be opened only by the addressed tenant using the tenant's individually recorded code or password, or by a door open command from the tenant's video interphone monitor unit or the shopping terminal. The addressed tenant can use also, for example, his car key that is recorded via an interface unit described in the referenced U.S. Pat. No. 7,290,702 to open the storage room door and the door of a cage containing a delivery for said addressed tenant himself.

By such system and as explained further, the delivered packages and parcels can be safely secured and retrieved only by the addressed tenant with no errors and efficiently. The video interphone and/or the shopping terminal systems described in U.S. Pat. Nos. 5,923,363, 6,603,842 and 6,940,957, U.S. and PCT applications Ser. No. 10/864,311 and PCT/US05/19564 provide for combining a plurality of entrance panels, including a television camera and select keys for simultaneously calling tenants from the different entrances, by keying apartment numbers or through an LCD displays that list the tenants by names and/or by displaying an apartment call number as assigned to each apartment (tenant). Advanced entrance panels offer direct call to the apartment through a scrolling of a tenant list and similar.

The present invention uses a dedicated video interphone entry panel with select keys and/or tenant list display, or other type of entry panels such as access control panels including select keys and/or tenant list displays to access the storage room and the lockers doors for delivery and retrievals. The panels may include such devices as finger print detector, face recognition sensor, card reader and any other access devices used in access control systems. Such devices provide for simplifying a tenant entry for retrieval of deliveries made to himself, and can be programmed to deny access to tenants having no delivery awaiting for them to pick up.

The method for operating the locked and secured lockers and/or the locks of the door or doors leading to the delivery rooms is to provide n number of lockers and n number of rooms in varying sizes and structure, to accommodate the practical average need of a given building. The type and size of the locker is selected by the deliveryman at the time of his requesting access, to correspond with its delivered package, parcel or goods, such as refrigerated locker, laundry hanging locker, and small, medium, large and extra large shelved lockers, will automatically address the corresponding door leading to the delivery room containing the selected locker. The door of the selected delivery room along with a door of an appropriate empty locker in the selected room are opened simultaneously by the local guardman or concierge and/or by a virtual doorman operator via the Internet or other network when local guardman in not available. Similarly it is possible to program the opening of an empty locker by an individual tenant via his video interphone or the shopping terminal.

When the deliveryman is tampering with any of the locked lockers or leaves the room with the locker door open and tries to close the delivery room door an alarm will be generated, the alarm bell will sound and an alarm signal will be communicated to the virtual doorman center. Simultaneously the door to the delivery room can be programmed to either firmly lock or firmly remain open. The preferred embodiment of the present invention is to keep the delivery room door open so that the interior is visible from the outside and that local guards or tenants can immediately enter the delivery room to identify at short time the alarm cause.

The apparatus of the preferred embodiment of the present invention include door close-open sensor in each locker and each delivery room, at least one movement or motion sensor in each of the delivery rooms, a video camera inside each delivery room and an optional video camera including a memory and content sensing program for identifying empty-non empty locker, an interface including CPU for interfacing the delivery system with the video interphone of the building and with the virtual doorman center and for controlling the video recording of all movements within the delivery rooms, the face of the deliveryman at the entrance to the room, and the optional recording of the packages placed in the lockers and the retrieving (removal) of the packages, and the print out of delivery receipt, including an optional print out of the deliveryman face.

Because the residents of apartment buildings are diverse, which mandates the system to be simple to handle and operate, with solutions for elderly people who easily forget passwords and/or have eyesight problems and cannot read displays easy. Further, deliveryman that has no experience in the handling of such automated secured delivery lockers, should not be confused and be able to process the delivery simply and fast, accordingly the preferred embodiment of the present invention as explained later provide a simple and easy method to complete the delivery.

The lockers may further include one or several indicators such as LEDs to indicate, for example, a locked position, opened position and alarm state. The preferred embodiment of the present invention uses spring activated mechanical arm to push the locker door to a fully open position for identifying the opened locker when no indicator is used and for exposing its interiors. Similarly the preferred embodiment uses door closer device that is set up to fully open the delivery room door when the lock is released to visually expose the room interiors when the door is opened. The preferred embodiment of the present invention uses the method of locking the delivery room door (denying fresh delivery), when a locker is forcibly opened, or when two or more lockers remain opened.

The terms cage, cages, locker and lockers in this application refer to any of the above mentioned different sizes or shaped lockers or cages including refrigerated storages and/or locked refrigerator, hanger for laundry items and shelved storages for storing packages behind locked doors. The term delivery room may be a locked room or rooms or an open area or areas without locked doors, such as a location in the building's lobby or basement or a corridor with controlled lockers, similar to coin lockers installed in airport terminals or in train stations.

The references to building or buildings in the following descriptions include multi units commercial buildings. The reference to apartment or apartments include commercial units and the reference to tenant or tenants include business and/or other organizations, be it owners of apartments and dwellers. The reference to package or packages include all types and sizes of delivery including envelopes, mail, boxes, food, laundry and similar.

BRIEF DESCRIPTION OF THE DRAWINGS

The foregoing and other objects and features of the present invention will become apparent from the following description of the preferred embodiments of the invention with reference to the accompanying drawings, in which.

DETAILED DESCRIPTION OF THE PREFERRED EMBODIMENTS

Figure 1:
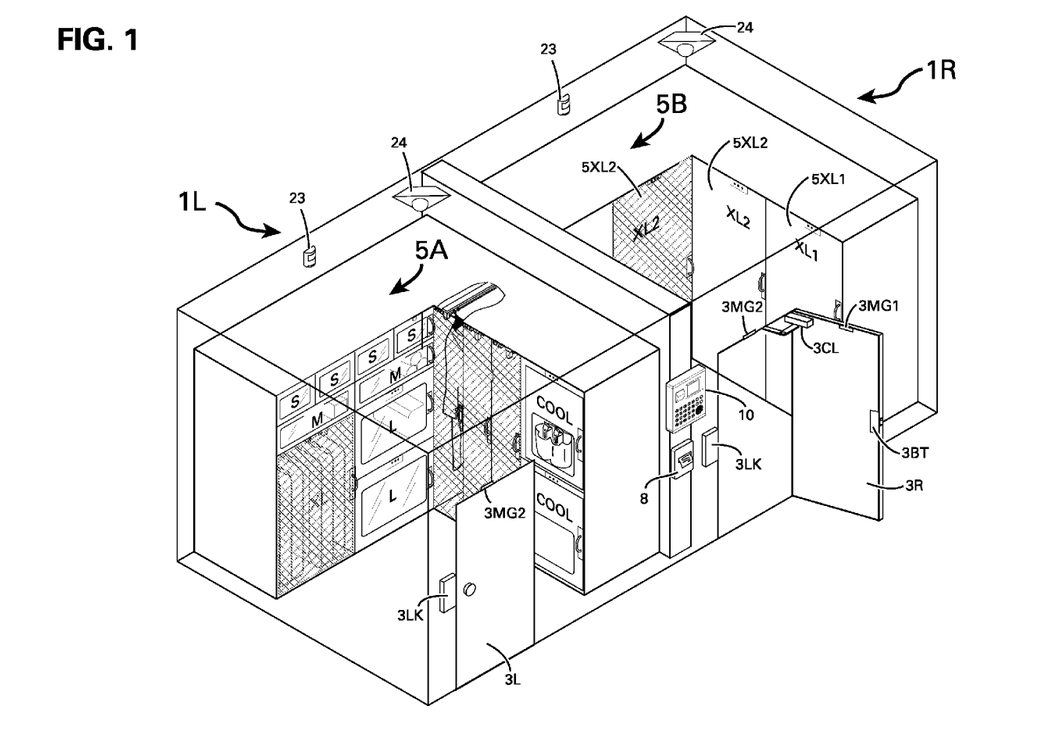
FIG. 1 is an overview of two delivery rooms including the lockers of the preferred embodiment of the present invention.
Figure 3:
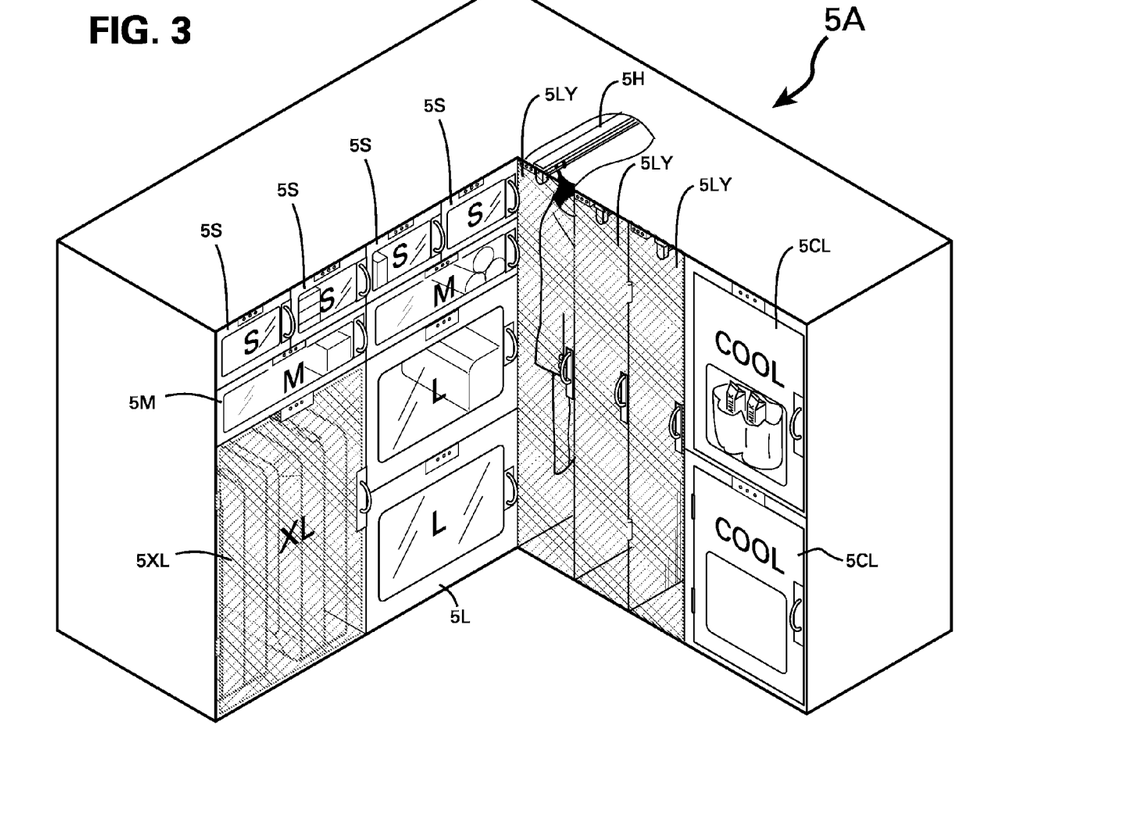
FIG. 3 is an overview of the different sizes and structure of the lockers of the preferred embodiment of the present invention.

Shown in FIG. 1 is an example of two storage rooms 1L and 1R with each having its entrance secured by remotely operated doors 3L and 3R with the left door is locked to place via an electric lock 3LK. The left room 1L contain a rack of lockers 5A shown also in FIG. 3 containing small lockers 5S, medium lockers 5M, large lockers 5L, an extra large locker 5XL, cool lockers 5CL and laundry lockers 5LY including a clothing hanger 5H. The laundry lockers 5LY and the large locker 5XL are shown with metal mesh doors to clearly expose the locker's interior from the outside, while the lockers 5S, 5M, 5L and 5CL are shown with security see through windows that can be made of high impact polycarbonate plastic material or acryl panel and/or a combination of metal mesh and plastic or glass materials that are strong to prevent breaking into the lockers, but provide visibility into the lockers from the outside.

The right room 1R includes a rack 5B of extra large lockers 5XL1 and 5XL2 with only one of the lockers 5XL2 is shown with a meshed metal door for see through, with all the others are shown locked by non see through doors and with no windows. Even though the preferred embodiment of the present invention uses locker doors that provide see through visibility from the outside in order to instantly see the content of the locker's interior, the lockers 5XL1 and 5XL2 shown are not visible from the outside. One reason is cost factor, see through construction is more expensive and large bulk lockers are not needed for some inexpensive large bulk and heavy packages that do not need security protection consideration. Moreover, some tenants may insist that all their packages should be concealed from others, and accordingly the rack of lockers or the delivery rooms may include lockers that do not reveal the interior content. Such lockers may be programmed to operate for specific tenant's use, or may be used for all the lockers if so elected by the tenants of a building.

The door 3R of the right storage room 1R is shown opened via the door closer device 3CL which is set to push the door open when its door bolt 3BT is released from the electrical door lock 3LK. As will be explained later the door position sensor 3MG2 activated by a magnet 3MG1 mounted on the door 3R or other door position sensors identifies the door status, open or close.

Figure 2:
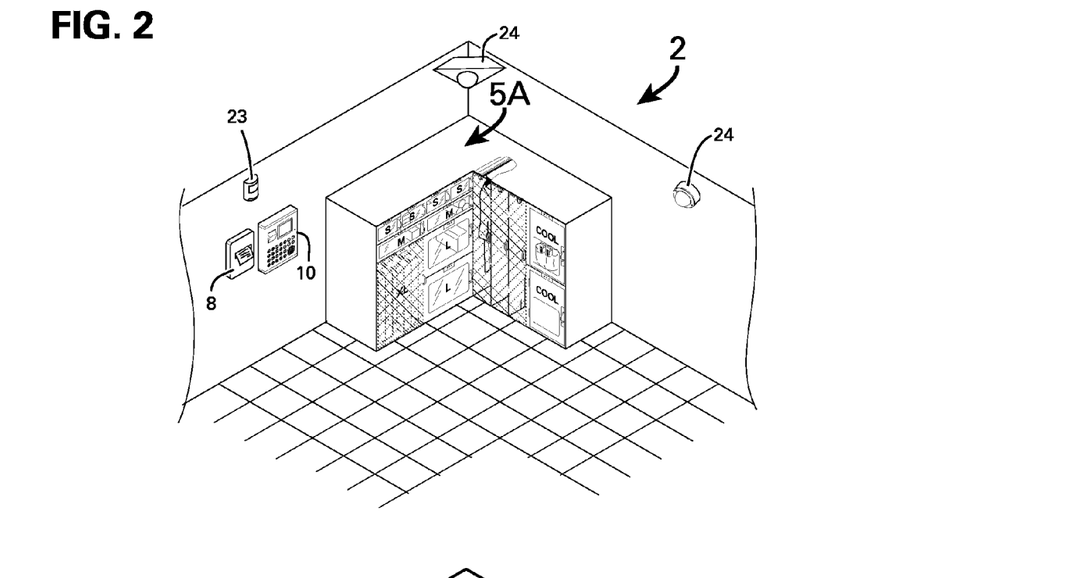
FIG. 2 is an overview of a delivery lockers corner in an open area, or a corridor including the entrance panel for operating the lockers of the present invention.

Each of the storage room 1L and 1R include a single motion detector 23 and s single surveillance camera 24, but any number of motion detectors and surveillance cameras can be used, depending on the coverage needed for the given structure of the delivery rooms and area 2 shown in FIG. 2.

A video interphone entry panel 10 is mounted onto the outside wall of the delivery rooms next to the doors 3R and 3L, for providing entry to the rooms and for opening a locker corresponding to the selected size and type of a locker for the addressed tenant. Also shown on the wall next to the entry panel 10 of FIG. 1 is a printer 8 is for providing a printed receipt to the deliveryman, to include such items as the time-date of the delivery, the tenant name, the apartment number, the locker number and a picture of the deliveryman and/or the package in the cage, any combination thereof and other items as programmed for the delivery transaction.

As will be explained later, the well known printer similar to printers in automated parking counter, can also be equipped with card reader for reading the identity of the tenants and of a deliveryman of a given near by shop that was issued such card by the building management. Even though such cards or similar access devices for identifying the deliveryman, and/or issued to couriers such as Federal Express, UPS or DHL are not mandatory for operating the delivery lockers, such cards improve the entry process to the building and to the delivery rooms for such authorized shops and couriers. The printer 8 or the entry panel 10 can also be provided with postal lock and with a barcode reader for including the barcode data of the delivered package into the processing of the delivery and for including the original barcode data into the printed confirmation or receipt as a reference to the delivery.

Similar video interphone entry panel 10 and a printer 8 are mounted next to the locker rack 5A, located in an open area 2 of a corridor or in the lobby floor or in a basement or other area of the building's common space, shown in FIG. 2. Otherwise the delivery area 2 of FIG. 2 is identical with the delivery room 1L with the exception that it is not protected by the door 3L shown in FIG. 1. A reference to a delivery room hereafter includes the open area 2 shown in FIG. 2.

Figure 4:
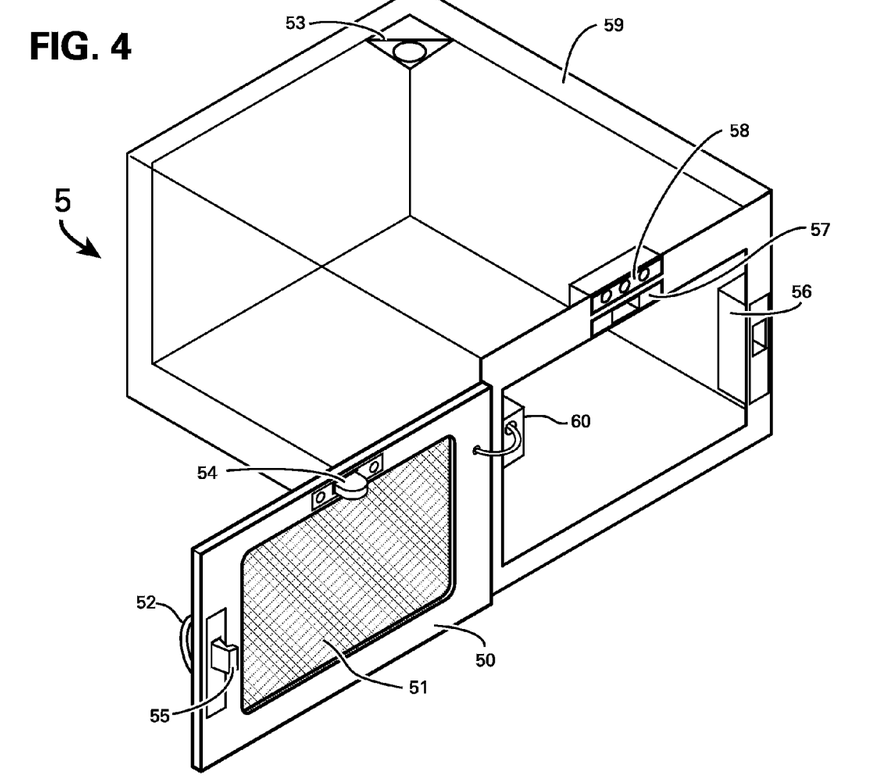
FIG. 4 is a detailed overview of the structure of a locker of the preferred embodiment of the present invention.

FIG. 4 shows a locker 5 of the preferred embodiment of the present invention including the case 59 and a door 50 that is shown in its fully open position, forced open by a well known spring actuated door opener 60. The door opener 60 can be combined into the door lock 56 using spring actuated pin or lever, or it can be any other structure such as rubber cushion attached to the locker's rim that pushes or forces the door to open when the door lock 56 is released. The locker includes a well known electrical door lock 56 for locking the door through a bolt 55 mounted on the door, a door lock sensor 57 including a micro switch 57 shown in FIG. 5 and activated by a plunger 54. The shown sensor 57 can be magnetic activated contact in which case the plunger 54 will be a magnet, or the sensor can be an optical interrupter in which case the plunger 54 will be a corresponding interrupter, or the sensor 57 can be any other proximity sensing device or other sensing device with a corresponding structure 54 for generating close or open door state signal. The sensor such as the micro switch 57 or such as a photo interrupter may be included inside the door lock 56 and the plunger 54 may be combined with the bolt 55.

The well known door lock 56 is activated by applying current to a coil of the door lock (not shown) via relay or via driver circuit that will be explained later. The door further include a see through window 51 shown as a metal mesh, but as explained above can be made of a durable plastic or glass materials, with or without embedded metal mesh and a door handle 52 for the convenience of tenants and the deliveryman. The indicators 58 on the top front of the body 59 above the door line (when the door is locked). The shown three indicators are driven by indicator driver 72 shown in FIG. 5 that control and drives the indicators to indicate that the door is open, close or that the locker is in an alarm state.

Even though three indicators are shown any number of indicators can be used, including LED or LCD indicators or displays to indicate the time and date of the delivery, the apartment number or the name of addressed tenant and/or any combinations thereof. Each of the shown three LED indicators 18 can be a single color or multi colors LED and can be programmed to indicate a status by switching any of the indicators 18 on-off in any selected color and for alert status indication by flashing lights in different colors and combinations for alerting to statuses such as long overdue storage, opened for retrieval but package is not removed and other similar indications as programmed.

The observation camera 53 is equipped with a lens that provide full coverage of the interior of the cage and includes a well known circuit and program for a motion detection within the boundaries of the locker's interior and for identifying a change in content, such when a package is entered or the package is retrieved. To simplify, the camera 53 is programmed to detect a motion inside the locker, identify if the locker is empty or if any item, substance or a packaged is introduced into the locker. If the illumination level is too low or if the door is solid metal door with no window the camera 53 may include illuminator such as LED or IR LED. The motion detection circuit and program can be a built in circuit inside the camera 53 or a circuit of the interface 7, or an add on circuit to the camera 53.

Figure 6:
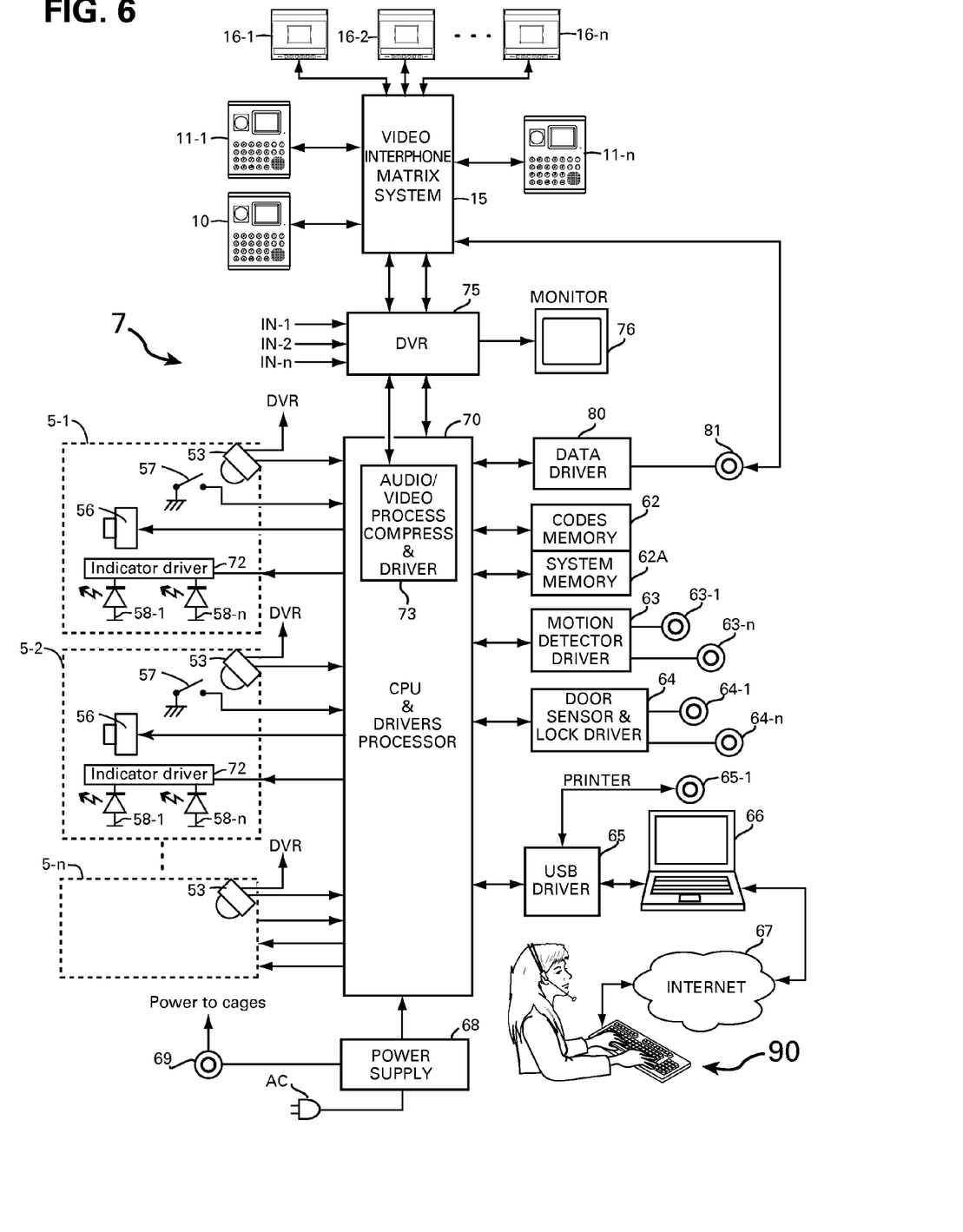
FIG. 6 is a block diagram of the interface unit and its connections to the lockers, the video interphone and the virtual doorman of the present invention.
Figure 7:
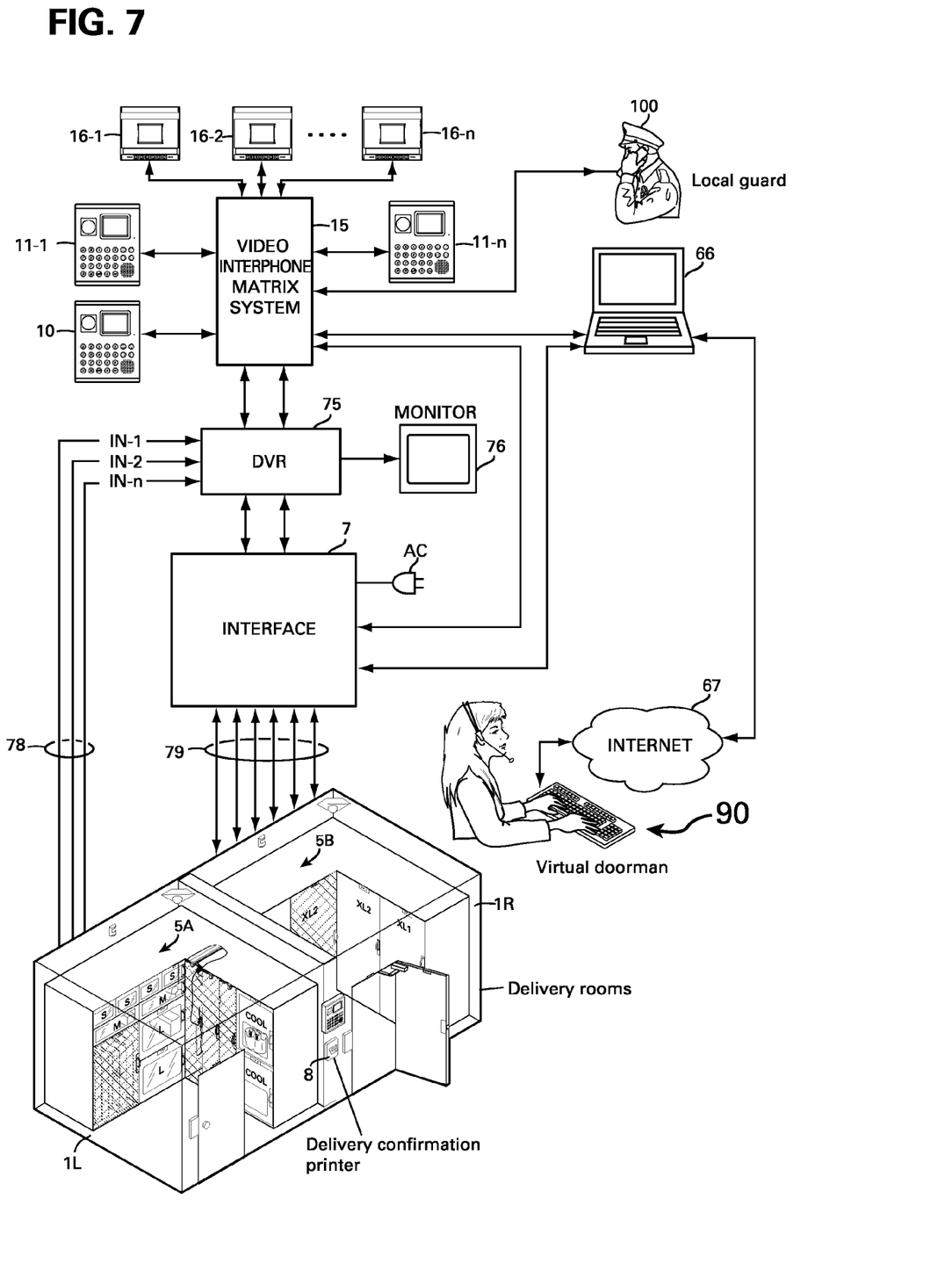
FIG. 7 is a comprehensive block diagram and the inter connections with the delivery rooms, the local guardman and the virtual doorman of the present invention.

The image generated by the camera 53 is recorded into the DVR 75 or the PC 66 shown in FIGS. 6 and 7. The inclusion of such camera 53 along with the door open-close sensor 57, the remotely operated door lock 56 and the ensuing data derived from the camera, the sensor and the lock transform the processing of the delivery and retrieval to a simplified, accurate delivery system and far safer and secured than the currently used locker and delivery rooms.

Figure 5:
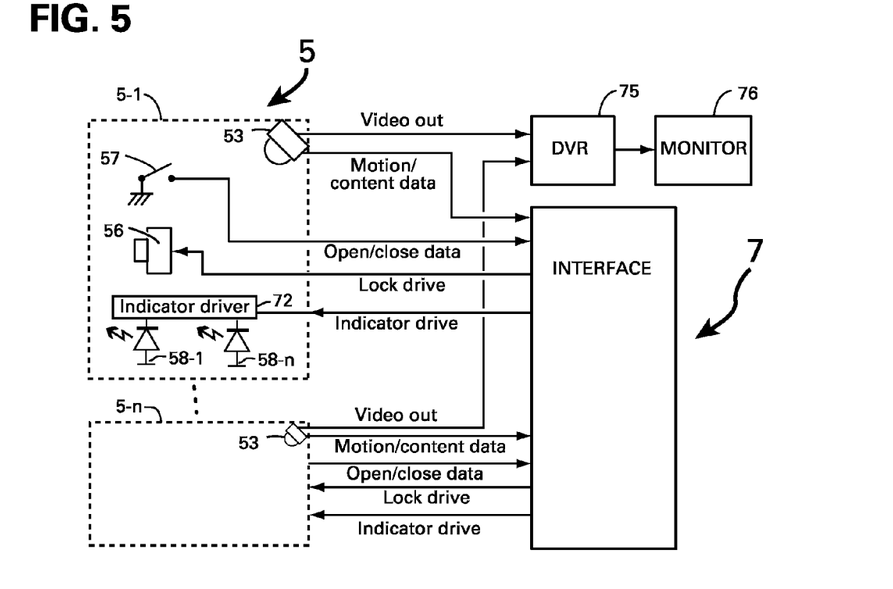
FIG. 5 is a block diagram of the lockers electrical drawings and the interconnections with the video interphone interface of the present invention.

Further, the video recorder (DVR) 75 shown in FIGS. 5, 6 and 7 records all the video signals generated by the locker's cameras 53, the storage room cameras 24, the cameras included in the video interphone entrance panels 10 shown in FIGS. 1, 2, 6 and 7 and of the video interphone panels 11 shown in FIGS. 6 and 7 as panels 11-1 and 11-n. The video recorder 75 may also connect to other security cameras in the building (not shown) that covers service entrance, lobby and other security locations in the building. The DVR 75 can be programmed to record routinely certain security cameras and/or to record only in response to a generated activity, such as motion is detected or when a visitor or a deliveryman addresses an apartment, the local concierge or the virtual doorman via any of the entry panels 11, or when a deliveryman, the local concierge or a tenant addresses the select keys of the entry panel 10 for delivery or retrieval of packages.

Similarly the cameras 24 of the delivery rooms 1L and 1R including the cameras 24 of the delivery corner 2 and the cameras 53 in the lockers can be individually or in sequence recorded when the corresponding motion detectors 23 or the door sensors 3MG2 and the locker door sensor 57 are activated, and/or by movement in the delivery rooms and/or by opening the corresponding door for a delivery into a given locker 5 and by detecting movement inside the locker by a camera 53.

By such recordings of every movement related to a delivery, stored in the DVR 75 and/or in the memory of the PC 66 of FIGS. 6 and 7 for a long time period such as several weeks, provide the means to identify every delivery and retrieval and any irregular and/or unlawful entering or tampering with the lockers and/or delivered packages. Such recordings, including the recording of faces will deter potential trespassers, be it a tenant from within the building or an outside robber from attempting to tamper with or steal a delivered package belonging to other tenant.

FIG. 6 shows a block diagram of the interface 7 and the inter connections to the video interphone system of a building including the connections via the Internet 67 to a virtual doorman 90 services. The video interphone system consists of a matrix system 15 connected to a plurality of entry panels 10, 11-1 and 11-n, and to video interphone monitoring units 16-1, 16-2 and 16-n, each installed in a given apartment of the building. As explained in details in the referenced U.S. Pat. Nos. 5,923,363, 6,603,842, 6,940,957 and 7,290,702 the video interphone system provides for simultaneous communications between entry panels 10 or 11 and apartments, between the entry panels and a local guard or concierge, between the entry panels and remote e-service provider and between the local guard and remote e-service provider. The disclosure in the referenced patents fully explains the recordings of all visitors, and the addressing of tenants via the entry panels and the ability to assign an entry panel for a specific entrance. By such arrangement it is obvious that deliveryman addressing a tenant via the entry panel 10 will have his face recorded and simultaneously control the entry to the assigned delivery room.

As disclosed in the referenced patent the matrix of the video interphone system further provides for communicating with the interface 7, which incorporates a CPU 70 and a memory 62 and 62A shown in FIG. 6 for interfacing the signals propagated via the internal communication lines with signals for communicating with e-service provider via a network such as the Internet.

The interface 7 and the CPU 70 process the data, alarm and control signals and includes a circuit 73 such as the well known DSP device commonly available in IC packages for digitizing and compressing the audio and the video signals and for outputting processed digital signals, comprising audio, video control, data, alarm signals through the USB driver 65 to the PC 66. The USB driver 65 is a well known circuit that is available in large varieties of packages ICs at low cost and it is offered with multiple USB connection ports, such as the connector 65-1 shown as a USB connector port for connecting the printer 8 shown in FIGS. 1, 2 and 7. The PC 66 connects to the Internet 67 using well known Internet connections such as DSL for communicating a processed interfaced digital signals with the virtual guardman 90.

The power supply 68 powers the interface and the lockers via the connector or terminals 69. The total current to the many door locks of the lockers could be heavy if they are operated simultaneously, but because only one or two door locks can be selected and operated simultaneously, the total current needed is not heavy. For this a commonly used DC or AC/DC power supply 68 can be used for operating the lockers, the interface 7 and the printer 8 along with the camera 53 inside the lockers cameras 24 and the motion detectors 23 inside the rooms 1L and 1R. Similarly the door locks 3LK for the doors 3L and 3R of the delivery rooms 1L and 1R can be powered by the power supply 68, or can be connected separately via any appropriate power supply. The same apply to the lockers which can be powered by any power supply that meets the power requirement.

The door locks 3LK and the door sensors 3MG1 are connected to the interface 70 through the door sensor and lock driver 64 and via the terminals or connectors 64-1 and 64-n for enabling n number of doors to be controlled. The driver 64 for receiving the sensor data and for operating the door locks is a well known driver amplifier using well known discrete transistors and other components or ICs for receiving data such as on-off, or contact closure data and for operating the door lock via well known heavy current relay and or high power drive transistor.

The motion detector 23 data is fed to the interface 7 through the motion detector driver 63 and via the connectors or terminals 63-1 and 63-n. The motion detector data consisting of yes-no motion, one way, and testing and setting data the other way from the PC 66, are amplified, and clipped and/or processed to remove the noise using well known signal drive transistors and other discrete components such as diodes, resistors and capacitors etc, or using well known ICs comprising two way digital signal processing amplifiers.

Similar buffer is used for the data driver 80 for communicating between the CPU 70 and the matrix 15. The preferred embodiment of the present invention uses standard RS422 signals for communicating between the matrix 15 and the interface 7, but any other standard or custom communication signals and/or and combinations of signals can be propagated via the data driver 80 and via the connector 81 for driving the signals two way. As explained above the two way data driver can use well known discrete parts and components or a well known IC devices such as explain above for the motion detector driver or buffer circuit 63.

The well known memory 62 and 63A can be two separate memory devices such as the well known flash memory IC or any other known memory devices, or can be a partitioned memory of the same memory device. The system memory 62A store all the applications and operation programs while the memory 62 stores and updates tenant lists, data of deliverymen, codes for operating and selecting the door locks through a lookup table and the lockers locks, logs of all activities and control the recording and the storage of the video and audio signals processed by the circuit 73.

The lockers 5-1, 5-2 and 5-n shown in FIG. 6 are connected to the interface 7 via door sensor and lock drivers (not shown), same as the driver explained above that are included in the CPU and drivers processor 70. The motion detection and content data from the cameras 53 are fed through a motion detector driver (not shown) similar to the driver explained above. The well known indicator driver 72 including the indicators 58-1 and 58-n are controlled by the CPU 70 ports for indicating the lockers statuses. As explained above, instead of the shown indicators 58-1 and 58-n, an indicators such as the well known LED panels, or LCD panel, or other display panels and/or the well known 7 segment LEDs can be used to display data pertaining to the locker size and number, open-close status, apartment number, the name of a tenant, the date of the delivery, the time of the delivery and many other items that can be programmed and are relating to the lockers, the delivery and to the addressee apartment or the recipient of the package.

The cameras 53 of the cages 5-1, 5-2 and 5-n shown in FIG. 6 are shown connected directly to the DVR 75 that is controlled by the matrix 75 and the CPU and drivers processor 70, however the camera 53 can be connected along with other CCTV cameras of the building and the cameras 24 shown in FIGS. 1 and 2 to a well known CCTV and security devices such as selectors, switchers, quads, multiplexers, frame switchers and be displayed via the shown monitor 76 or by other monitors (not shown) of a CCTV system of the building and by any video interphone monitor unit 16-1, 16-2 and 16-n of a given apartment for which the package is addressed to.

The vide interphone monitors 16-1, 16-2 and 16-n can be n number of video interphone monitor units or shopping terminals as explain in the US and PCT application referred to above. Similarly the matrix 15 shown in FIGS. 6 and 7 can be a matrix, hub or a router unit incorporated in a shopping terminal system of a building that includes entry panels for at least accessing the delivery rooms and cages. Further the video interphone system and/or the shopping terminals system along with the operating programs of the matrix 15 and the interface 7 can generate a display message or a voice message or switch on an indicator and any combination thereof onto the video interphones 16-1~16-n and/or the shopping terminals to advise or remind a tenant that there is a delivered package in a locker for him to retrieve. The message or messages (for several deliveries) include the locker numbers or description and at the same time activate the "locker open" key or an icon of a touch screen that is incorporated in the video interphone monitor 16-1, ~16-n and the shopping terminal for enabling the opening of the referred to locker or the lockers from inside the apartment and go to the locker to retrieve the package.

The retrieval of packages from a locker according to the present invention is designed to be a simple process, yet ensuring that only the addressee will retrieve his or hers delivered package. For this each tenant can use his own individual access code or password that was recorded for opening the entrance door to the building, similar to a commonly used keypad of an electric lock for entering a building. With such arrangement and program, the entry panel 10 or 11 that is explained below, will automatically for example, display a message advising the entering tenant that there is a package delivered in a given locker, requiring the entering tenant only to affirm the retrieval via one or more select keys, which will open the given locker and the delivery room door automatically.

Similarly any access device such as magnetic card, RFID card, proximity key and biometric sensors that are explained later can be used to enter the building and initiate an automatic retrieval process, by opening the door to the delivery room and the locker containing a package addressed to the entering tenant.

The camera 53 output signals can be propagated via the DVR 75, or via other (not shown) CCTV selector, to the video process and compress circuit for feeding processed, digitized and compressed signals to the virtual doorman 90 via the USB driver 65, the PC 66 and the Internet 67 for identifying and confirming the delivery of a package into a closed locker 5.

The well known door units or the entry panels 10, 11-1 and 11-n are the door units of the video interphone systems disclosed in the referenced US patents and/or the entry panels of a video interphone system associated with the shopping terminals disclosed in the referenced U.S. application Ser. No. 10/864,311 and International PCT application PCT/US05/19564 and are included in the preferred embodiment of the present invention. The shown entry panels 10 and 11 include a display monitor and call, select and process keys including up-down shift keys and page forward-backward shift keys for selecting through the displays the tenant names and apartment numbers or codes. The program further provides for selecting lockers type and sizes, the building's entrances and the delivery rooms and doors. The entry panels include also programs for identifying the deliveryman using short process when the deliveryman is an approved by the management.

Entry panels 10 or 11 connected to biometric sensors provide for identifying the deliveryman and each tenant by his biometrics details such as eye pattern recognition, finger recognition, face recognition, or verifying that his keyed identification coincides with an assigned access card, at which time he will be able to enter the building via the entry panel 11 and the delivery room via the entry panel 10. The above referred U.S. Pat. No. 7,290,702 discloses an interface for recording remote control device used by each tenant, such as the tenant's car key and utilize the recorded data to access the building through a reader associated with the entry panel. By providing range of readers such as magnetic reader, mechanical reader such as for punched card, optical reader, proximity reader, RF, IR and combination of readers and devices, each tenant can have its convenient device, such as his car key recorded to the interface 7 that contains the circuits disclosed in the above referred to US patent and utilize his car key in combination with a retrieve program, included in the entry panel, to open a locker that includes a delivery addressed to himself.

In order to complete a given delivery directly to the addressee, the deliveryman will commonly call first the addressee via the entry panel 11, but when the addressee is not answering, the entry panel 11 is programmed to display messages directing the deliveryman to call the concierge 100 or the virtual doorman 90 and simplified menus for guiding the deliveryman in his delivery processing. The entry panels 10 and 11 are further programmed to generate selection menus for the lockers, including the selection of locker sizes and the locker environment as referred to above, including ambient environment, cooled lockers, frozen or refrigerated lockers, laundry lockers which as explained above require hanger for hanging the dry cleaned laundry and bulk lockers for large bulky delivery.

It is very important to ascertain that, if for example, a selected frozen locker is unavailable and the deliveryman deposited ice cream in an ambient locker, the deliveryman should be held responsible for his miss-selection. Further some building may have only one type of locker with no selection for sizes nor for environment, or it may be that the specific locker are occupied by prior deliveries. For this reason the entry panels are programmed to display a menu calling for a confirmation by the deliveryman, requiring the deliveryman decision to abandon the delivery attempt or accept the available lockers as fit for the intended delivery.

Only after the deliveryman elected to accept the locker as fit the program will display a call divert guide for calling the local concierge 100 or the virtual doorman 90. This is because at this step the selected tenant is known and the selection of a locker is complete, recorded and logged, so they can be instantly displayed and verified through the local concierge or the virtual door station PC, requiring only to identify the deliveryman before allowing him to enter the building.

Shown in FIG. 7 is the delivery system setup of the present invention including the local guard or concierge 100, the virtual doorman 90, the video interphone system and the delivery rooms and lockers and the interconnections of the system. The interface 7 installed close to the delivery rooms 1L and 1R is connected via multi core cable or cables 79, such as category 5 twisted pairs cables known as CAT 5 and power cables for carrying the power to the locker's door lock and the cameras. As explained above the shown camera connections are via a transmission lines 78 such as coax cables, fiber optic or LAN cables or any other network cables for IP cameras and combinations thereof.

The camera interconnection are shown to the DVR 75 only, but as explained above the cameras 53 and 24 and any other CCTV or other cameras in the building can be combined and included in the recording and the observation system for viewing by the local guard 100 via the monitor 76 and/or other monitors (not shown) and the PC 66 and by the tenants through their individual video interphone monitor 16-1, 16-2 and 16-n. Similarly the camera signals can be propagated via the interface 7 and the PC 66 to the virtual doorman station 90.

It should become obvious from the disclosed details of the preferred embodiment of this invention that the connection of the lockers 5 of the delivery room 1L, 1R and 2 via the interface 7 with the video interphone system disclosed in the US patents referred to above provide for a simplified step by step remote controlling of deliveries to multi units and apartment buildings, including the ability to record and verify deliveries, retrievals and unlawful acts relating to any of the deliveries and to the delivered packages. It is also clear that the method and the apparatus of the present invention provide for safer processing by a virtual doorman and/or by a local concierge or guard, and that the interfacing of each tenant for retrieval of the deliveries that are addressed to himself is a simple and secure processing.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for connecting and controlling plurality of lockers in a multi tenants building selected from residential apartments and commercial units for delivering and retrieving packages, said building including video interphone system comprising at least one video interphone monitor allotted to each tenant, at least one entry panel and at least one of an entry controller selected from a local concierge station and a virtual doorman station;

said lockers selected from a group comprising homogeneous lockers, diverse lockers and diverse storage environment, with each locker including a door, a door sensor for outputting at least one of door open signal and door close signal, a remotely operated electric lock and a door opener for actuating said door to open, wherein said door sensor and said electric lock are connected to an interface for interfacing said controller with said video interphone system;

said entry panel includes keys for calling, selecting and processing a delivery, one of a display monitor and a display panel for displaying at least one of tenant list and calling codes, at least one of delivery procedure menus selected from a group comprising said lockers selection, said storage environment selection, acceptance of a fit locker, call divert guide, combinations thereof and are calling link to said delivery procedure menus upon unrealised calling of an addressee, said method comprising the steps of:

Selecting said addressee through said keys and one of said calling codes and said tenant list for calling a selected tenant;

waiting for one of a reply from said selected tenant and said recalling link upon said unrealised calling;

recalling said delivery procedure menu for selecting said fit locker on the basis of availability and proceeding with one of abandoning said delivery and accepting said availability;

calling said entry controller through said keys as guided by said call divert guide for identifying the deliveryman;

requesting said entry controller to open said fit locker and an entrance to said building for enabling said delivering;

entering said building through the opened said entrance and depositing a package into the opened said fit locker; and locking said fit locker for completing said delivering and for generating a delivery message selected from a group comprising display message, voice message, LED indication and a combination thereof to said video interphone monitor of said selected tenant.

2. The method for connecting and controlling plurality of lockers according to claim 1, wherein said locker include at least one LED indicator and said method comprises the further step of:

displaying said locker state selected from a group comprising, package inside, empty, open, close, alarm and combinations thereof.

3. The method for connecting and controlling plurality of lockers according to claim 1, wherein said locker includes an alphanumeric display panel and said method comprises the further step of:

Displaying at least one of messages selected from a group comprising ready for delivery, the apartment number, the tenant name, the date of the delivery, the time of the delivery, the delivery company, over due retrieval, open, close, forcibly opened, empty, package inside, alarm, error, out of order, reserved, locker number and combinations thereof.

4. The method for connecting and controlling plurality of lockers according to claim 1, wherein said door is one of transparent and non transparent, and wherein at least said locker with said non transparent door includes supervision accessories selected from a group comprising a camera, a camera with motion detector, an alphanumeric display panel, at least one LED indicator and combinations thereof;

said camera outputs one of digital and analog video signal for at least one of displaying and recording the interior of said locker, and said camera with motion detector further outputs a motion signal for identifying motion inside said locker and a content signal for identifying the content of said locker from one of empty and package inside, said method comprises the further steps of:

detecting motion signal for outputting said video signal to at least one of said interface and said video interphone system for at least one of displaying and recording;

outputting said content signal to said interface; and employing at least one of said video signal and said content signal to confirm the completion of said delivery.

5. The method for connecting and controlling plurality of lockers according to claim 4, wherein said locker with said non transparent door and said locker located in a dark room include one of illuminator and at least one IR LED for enabling said camera and said camera with motion detector to operate.

6. The method for connecting and controlling plurality of lockers according to claim 1, wherein said video interphone monitor includes a release key selected from one of a button and a touch screen icon for opening said fit locker, operable when said delivery message is displayed, and wherein said retrieving comprises the further steps of:

reviewing said message via said video interphone monitor;

opening said fit locker through a retrieve process selected from a group comprising operating said release key, keying a password via said keys of said entry panel, operating a prerecorded access device via a reader selected from a group comprising mechanical, magnetic, optical, proximity, RF, IR and combinations thereof interfaced with said entry panel, and automatically via a biometric reader connected to said video interphone system;

retrieving said package from the opened locker and relocking said opened locker.

7. The method for connecting and controlling plurality of lockers according to claim 1, wherein the exteriors of said lockers are protected by at least one of a camera and a motion detector for at least one of displaying and recording movements near said lockers including deliveries and retrievals through at least one of said interface and said video interphone system;

said lockers are confined to one of a common space and a walled area with access via a second locked door controlled by said entry controller; and wherein said step of requesting said entry controller to open said entrance and said step of entering said building includes the opening of said second locked door and the entering into said walled area.

8. The method for connecting and controlling plurality of lockers according to claim 1, wherein said delivery is verified through a printer located nearby said lockers for printing a delivery confirmation.

9. The method for connecting and controlling plurality of lockers according to claim 1, wherein said entry panel is interfaced with an entry access reader selected from a group comprising mechanical, magnetic, optical, proximity, RF, IR, biometric and combinations there of for improving said step of identifying said deliveryman.

10. The method for connecting and controlling plurality of lockers according to claim 1, wherein said storage environment is selected from a group comprising ambient, chilled, frozen, dry cleaning with hanger, shelves, bulk and combinations thereof.

11. A delivery system including plurality of lockers in a multi tenants building selected from residential apartments and commercial units for delivering and retrieving packages, said building including video interphone system comprising at least one video interphone monitor allotted to each tenant, at least one entry panel and at least one of an entry controller selected from a local concierge station and a virtual doorman station;

said lockers selected from a group comprising homogeneous lockers, diverse lockers and diverse storage environment, with each locker including a door, a door sensor for outputting at least one of door open signal and door close signal, a remotely operated electric lock and a door opener for actuating said door to open, wherein said door sensor and said electric lock are connected to an interface for interfacing said delivery system with said video interphone system;

said entry panel includes keys for calling, selecting and processing a delivery, one of a display monitor and a display panel for displaying at least one of tenant list and calling codes, at least one of delivery procedure menus selected from a group comprising said lockers selection, said storage environment selection, acceptance of a fit locker, call divert guide, combinations thereof and a recalling link to said delivery procedure menus;

each of said local concierge station and said virtual doorman station is provided with two way voice communication, at least one way video communication and one of keys and a keyboard for controlling said lockers and said entrance; and wherein said entry controller uses one of said keys and said keyboard to open said entrance and a selected locker in response to said call divert by a deliveryman upon acceptance of said fit locker and a positive identification.

12. The delivery system including plurality of lockers according to claim 11, wherein said locker include at least one LED indicator for displaying said locker state selected from a group comprising, package inside, empty, open, close, alarm and combinations thereof.

13. The delivery system including plurality of lockers according to claim 11, wherein said locker includes an alphanumeric display panel for displaying at least one of messages selected from a group comprising ready for delivery, the apartment number, the tenant name, the date of the delivery, the time of the delivery, the delivery company, over due retrieval, open, close, forcibly opened, empty, package inside, alarm, error, out of order, reserved, locker number and combinations thereof.

14. The delivery system including plurality of lockers according to claim 11, wherein said door is one of transparent and non transparent, and wherein at least said locker with said non transparent door includes supervision accessories selected from a group comprising a camera, a camera with motion detector, an alphanumeric display panel, at least one LED indicator and combinations thereof;

said camera outputs one of digital and analog video signal pertaining to the interior of said locker, and said camera with motion detector further outputs a motion signal for identifying motion inside said locker and a content signal for identifying the content of said locker from one of empty and package inside; and wherein said motion signal is used to activate at least one of recording and displaying of said video signal via at least one of said interface and said video interphone system and at least one of the outputted said video signal and said content signal is used to confirm the completion of said delivery.

15. The delivery system including plurality of lockers according to claim 14, wherein said locker with said non transparent door and said locker located in a dark surrounding include one of illuminator and at least one IR LED for enabling said camera and said camera with motion detector to operate.

16. The delivery system including plurality of lockers according to claim 11, wherein said video interphone monitor includes a release key selected from one of a button and a touch screen icon for opening said fit locker, operable when said delivery message is displayed, and wherein the opening of said fit locker for said retrieving is selected from a group comprising operating said release key, keying a password via said keys of said entry panel, operating a prerecorded access device via a reader selected from a group consisting of mechanical, magnetic, optical, proximity, RF, IR and combinations thereof interfaced with said entry panel, and automatically via a biometric reader connected to said video interphone system.

17. The delivery system including plurality of lockers according to claim 11, wherein the exteriors of said lockers are protected by at least one of a camera and a motion detector for at least one of displaying and recording movements near said lockers including deliveries and retrievals through at least one of said interface and said video interphone system; said lockers are confined to one of a common space and a walled area with access via a second locked door controlled by said entry controller, and wherein said entry controller opens said second locked door timed with the opening of said entrance.

18. The delivery system including plurality of lockers according to claim 11, wherein said delivery is verified through a printer located nearby said lockers for printing a delivery confirmation.

19. The delivery system including plurality of lockers according to claim 11, wherein said entry panel is interfaced with an entry access reader selected from a group comprising mechanical, magnetic, optical, proximity, RF, IR, biometric and combinations thereof for improving said step of identifying said deliveryman.

20. The delivery system including plurality of lockers according to claim 11, wherein said storage environment is selected from a group comprising ambient, chilled, frozen, dry cleaning with hanger, shelves, bulk and combinations thereof.

* * * * *